US008593731B2

(12) United States Patent
Lo

(10) Patent No.: US 8,593,731 B2
(45) Date of Patent: Nov. 26, 2013

(54) THREE DIMENSIONAL IMAGE ALIGNMENT

(75) Inventor: Anthony Lo, Hong Kong (CN)

(73) Assignee: Anthony Lo, Hong Kong (CN)

( * ) Notice: Subject to any disclaimer, the term of this patent is extended or adjusted under 35 U.S.C. 154(b) by 635 days.

(21) Appl. No.: 12/455,949

(22) Filed: Jun. 8, 2009

(65) Prior Publication Data
US 2009/0303587 A1 Dec. 10, 2009

Related U.S. Application Data

(60) Provisional application No. 61/131,280, filed on Jun. 6, 2008.

(51) Int. Cl.
G02B 27/22 (2006.01)

(52) U.S. Cl.
USPC ........... 359/473; 359/476; 359/477; 359/472; 359/376

(58) Field of Classification Search
USPC ......... 359/462, 464, 467, 468, 470–474, 476, 359/477, 376–378, 379, 411, 412
See application file for complete search history.

(56) References Cited

U.S. PATENT DOCUMENTS

| 4,009,929 | A | * | 3/1977 | Abe et al. | 359/377 |
| 5,355,253 | A | * | 10/1994 | Nanjo et al. | 359/473 |
| 5,530,587 | A | * | 6/1996 | Sander et al. | 359/376 |
| 5,557,454 | A | * | 9/1996 | Takahashi | 359/378 |
| 6,825,962 | B2 | * | 11/2004 | Morita | 359/212.1 |

OTHER PUBLICATIONS

Park Cameras "SLR Lenses Explained—Park Carreras Online," Dec. 11, 2008, WEB.ARCHIVE.ORG/WEB/20081211073255/HTTP://WWW.PARKCAMERAS.COM/ARTICLE/51/SLR-LENSES-EXPLAINED.HTML.
Park Cameras: "Introduction To Digital SLR Lenses," Jan. 27, 2012, HTTP://WWW.PARKCAMERAS.COM/ARTICLE/51/SLR-LENSES-EXPLAINED.HTML.

* cited by examiner

Primary Examiner — Audrey Y Chang
(74) Attorney, Agent, or Firm — David Lewis

(57) ABSTRACT

In an embodiment, two retro-focus lens systems are configured to provide a stereoscopic image. In an embodiment, each retro-focus lens system has a low power negative lens group with a long focal length. In an embodiment, each retro focus lens system has an optical component mounted with three points. One optical component is associated with a first of the two retro-focus lenses. The three points may be loosened, such that the optical component may be adjusted in a first direction, which in turn moves the corresponding image in the opposite direction. Another optical component is associated with the other retro focus lens system. The other optical component has a second set of points that may be loosened such that the other optical component may be adjusted in a second direction that is perpendicular to the first direction, moving the corresponding image in the opposite direction from the second direction.

13 Claims, 6 Drawing Sheets

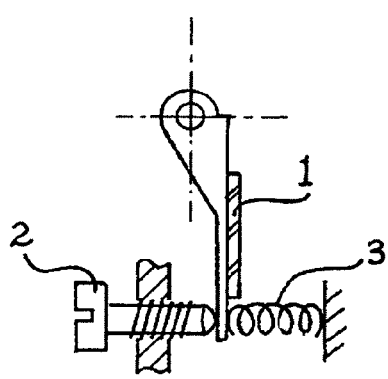
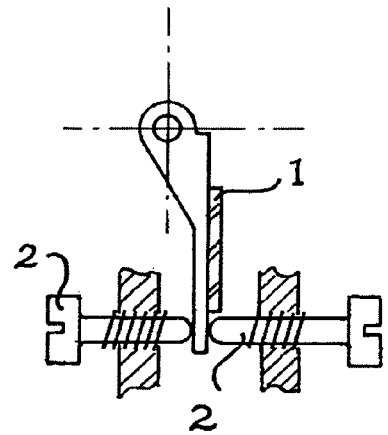
FIG 1
FIG 2
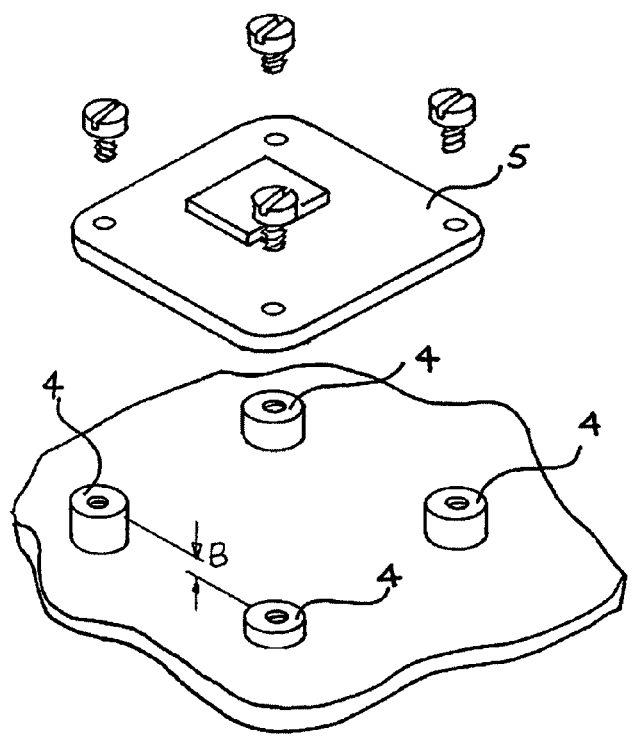
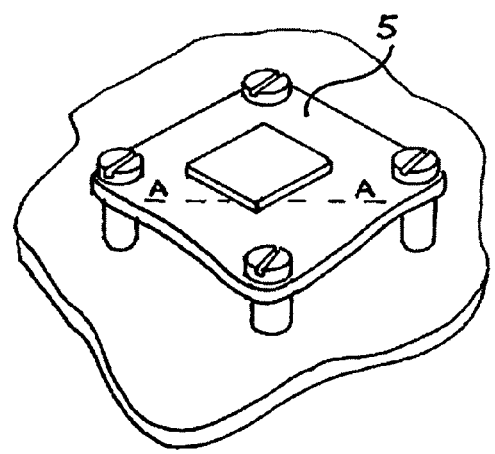
FIG 3
FIG 3A

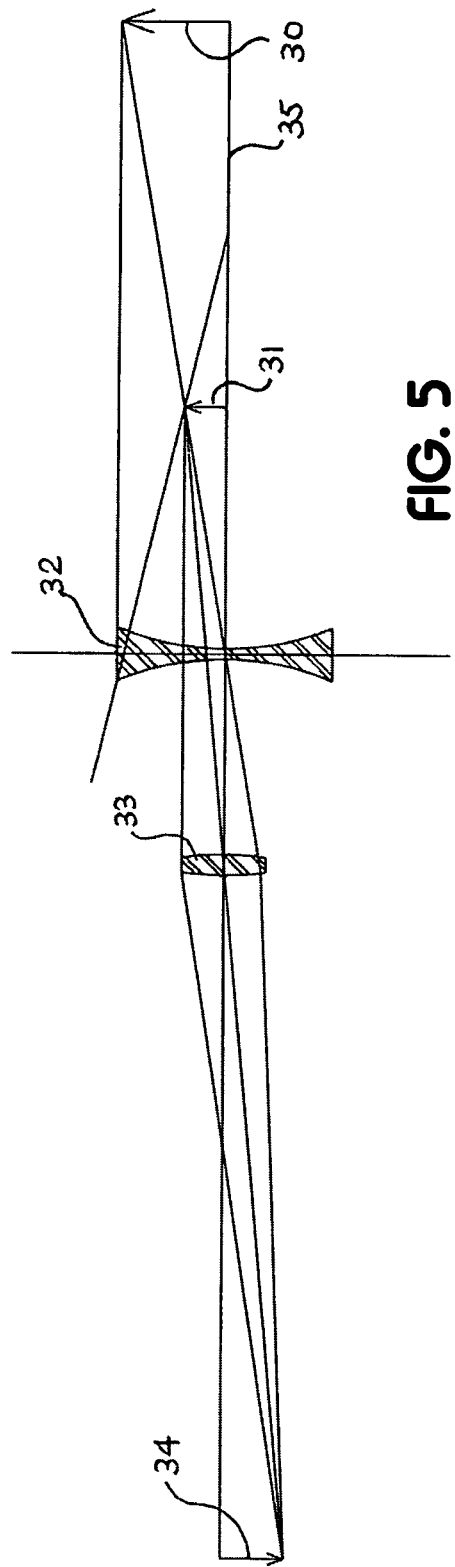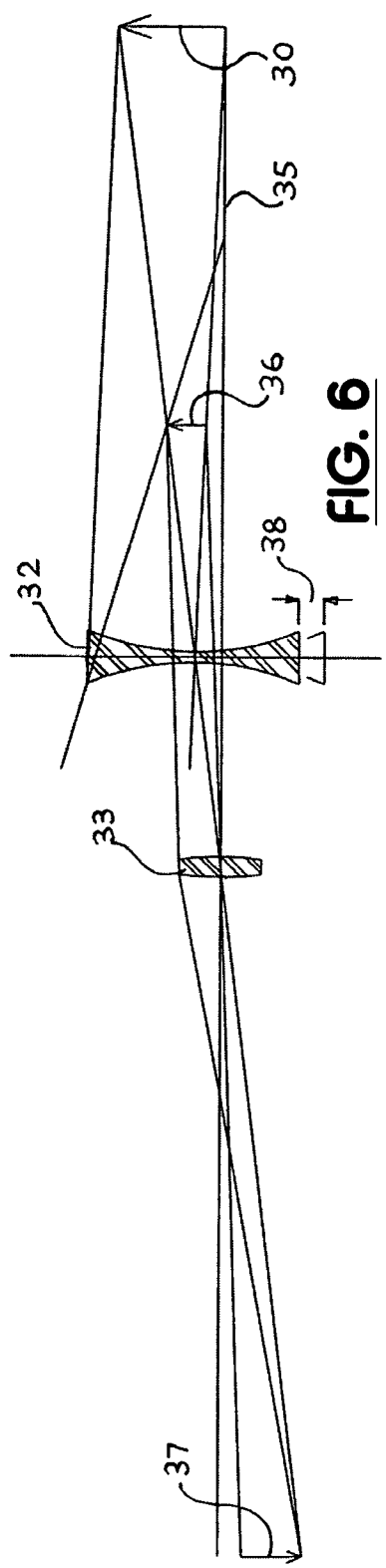

THREE DIMENSIONAL IMAGE ALIGNMENT

CROSS-REFERENCE TO RELATED APPLICATIONS

This application claims priority benefit of U.S. Provisional Patent Application No. 61/131,280, filed Jun. 6, 2008, which is incorporated herein by reference.

FIELD

This specification relates to three dimensional imaging.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A pair of images that are used for forming a three-dimensional image of a stereoscopic viewer needs to be aligned properly for comfortable viewing. Horizontal alignment is necessary so that the two eyes do not need to diverge in order to view the image. A small amount of convergence is desirable in the image.

Vertical alignment is necessary to avoid double vision. When there is double vision the three dimensional effect is lost. The simple but tedious method of achieving vertical alignment is to move each final image (e.g., each final print or screen image) relative to each other.

The inventor has determined that a better way to form a stereoscopic image is to align a pair of images when the pair of images is captured on an image-capturing device of a camera. Most cameras have a single image-capturing device, such as a film or an image sensor (e.g., a charge couple device can be an image sensor).

Since several components are assembled together, the build up of tolerance errors is unavoidable. Aligning the image on an image capturing device requires high precision since the captured images are usually enlarged for viewing. To maintain the alignment during the working life of the equipment, it is best that the components are not under any stress such as spring tension. Also, vibration and shock loads may upset the settings.

FIG. 1 shows a mount for mounting a mirror or prism, having mirrors (item 1), adjustment screws (item 2), and a spring (item 3). Similarly, FIG. 2 shows another mount for mounting a mirror or prism, having mirrors (item 1), adjustment screws (item 2).

With reference to FIG. 1, where mirrors (item 1) or prisms are used, in order to achieve the prefect alignment with no backlash, usually adjustment screws (item 2) are arranged to press, or work, against a spring (item 3) (backlash is the loss of motion between driving and driven elements due to clearance between parts). Alternatively, sometimes two adjustment screws (item 2) work against each other, see FIG. 2 in order to hold the screws in one position. Both methods, that is the mounts of both FIGS. 1 and 2, involve stress.

Also, the methods of FIGS. 1 and 2 allow adjustments in only one plane. Usually two different mirrors or prisms along the optical path will have to be adjusted separately to provide X and Y axis alignments (which may be referred to as horizontal and vertical alignment). The need to adjust two mirrors along the same optical path doubles the labor cost and doubles the chances of drift in the alignment with time or during use.

FIGS. 3 and 3A show a mounting arrangement with four mounting points (item 4), having height difference B (FIG. 3), plate (item 5), line 'A'-'A' (FIG. 3A). FIGS. 3 and 3A show a mounting arrangement with 4 mounting points (item 4). If all four are slightly different in height, as shown at B (FIG. 3), due to a manufacturing error (for example), the plate (item 5) is bent when screwed down tightly, and consequently stress sets in along the lines 'A'-'A' (FIG. 3A).

BRIEF DESCRIPTION

In the following drawings like reference numbers are used to refer to like elements. Although the following figures depict various examples of the invention, the invention is not limited to the examples depicted in the figures.

FIG. 1 shows a mount for mounting a mirror or prism.

FIG. 2 shows another mount for mounting a mirror or prism.

FIGS. 3 and 3A show a mounting arrangement with four mounting points.

FIG. 5 shows an embodiment of a retro-focus lens ray diagram.

FIG. 6 shows an embodiment of a ray diagram of another retro-focus lens according to the invention.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

In general, at the beginning of the discussion of each of FIGS. 1-7 is a brief description of each element, which may have no more than the name of each of the elements in the one of FIGS. 1-7 that is being discussed. After the brief description of each element, each element is further discussed. In general, each of FIGS. 1-9 is discussed in numerical order except when indicated otherwise. Nonetheless, there is no one location where all of the information of any element of FIGS. 1-9 is necessarily located. Unique information about any particular element or any other aspect of any of FIGS. 1-9 may be found in, or implied by, any part of the specification.

In an embodiment, a method is implemented for adjusting the image by configuring lenses to achieve a twin image alignment. All the key components may be mounted on three points (similar to a tripod) and are screwed tightly in place once the alignment is achieved. The three-point mounting eliminates redundant mounting points, which may otherwise cause stress and misalignment during use.

In one embodiment, a mounting arrangement having only three mounting points is located in a three dimensional image forming device that includes a pair of retro-focus lenses (in other embodiments other types of lens systems may be used instead). In contrast to FIG. 3, the current inventor determined that if there are only three mounting points, a small error in height of the mounting points would only cause the components to tilt slightly but there would be no stress (no matter what the error is). In other words, the current inventor determined that when using only three mounting points, the small error in height is usually harmless and/or can be corrected by shimming.

Figure 4:
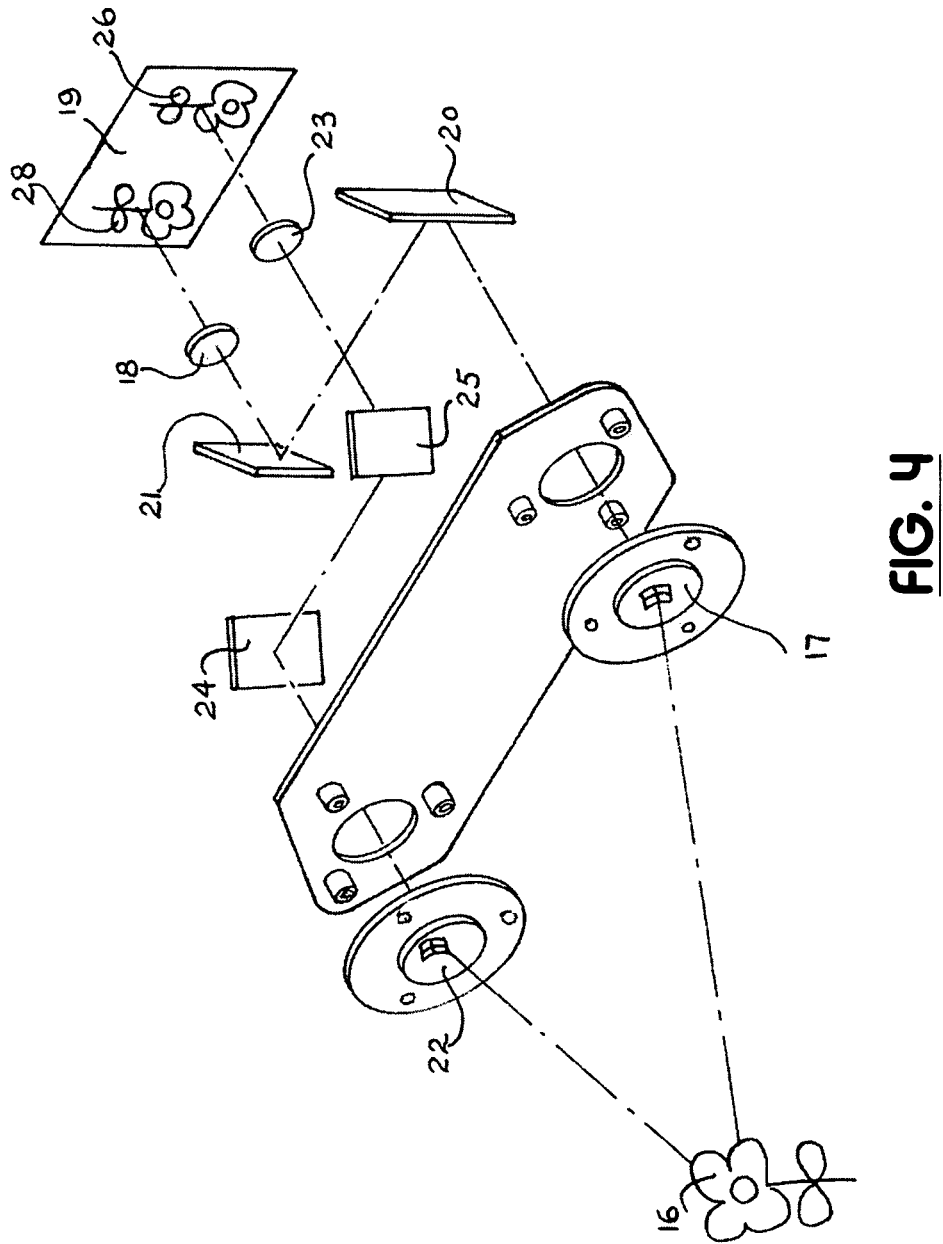
FIG. 4 shows an isometric view of a mounting arrangement having only three mounting points.

FIG. 4 shows an isometric view of a mounting arrangement having only three mounting points. The arrangement of FIG. 4 has object (item 16), negative lens group (item 17), positive lens group (item 18), image-capturing device (item 19), mirrors (items 20 & 21), negative lens group (item 22), positive lens group (item 23), mirrors (items 24 & 25), sharp image (item 26), and sharp image (item 28). In other embodiments, the mounting arrangement of FIG. 4 may not have all of the elements or features listed and/or may have other elements or features instead of or in addition to those listed.

In FIG. 4, rays from the object (item 16) are captured by the negative lens group (item 17) reflected by the mirrors (items 20 & 21) and focused by the positive lens group (item 18) onto the image-capturing device (item 19) as a sharp image (item 28). Negative lens group (item 17) and positive lens group (item 18) together form a retro-focus lens. Similarly, rays from the object (item 16) are also captured by the negative lens group (item 22) reflected by mirrors (items 24 & 25) and focused by the positive lens group (item 23) onto the image capturing device (item 19) as a sharp image (item 26). The combination of lens groups (items 22 & 23) forms another retro focus lens. Negative lens groups (items 17 and 22) are mounted on flanges, each having three holes that may be screwed to a corresponding set of three posts on a plate.

FIG. 5 shows a first retro-focus lens ray diagram, having virtual image (item 31), object (item 30), weak negative lens group (item 32), positive lens group (item 33), real image (item 34) and principal axis (item 35).

In FIG. 5, the combination of weak negative lens group (item 32) and positive lens group (item 33) forms the retro-focus lens. Rays from the object (item 30) striking the weak negative lens group (item 32) will diverge and form a virtual image (item 31). This virtual image is focused by positive lens group (item 33) as a sharp real image (item 34). Since the base of the object is on the principal axis (item 35) the base of the inverted image (item 34) is also on the principal axis.

FIG. 6 shows a ray diagram of another retro-focus lens, having object (item 30), negative lens (item 32) positive lens group (item 33), principal axis (item 35), virtual image (item 36), real image formed (item 37), and distance (item 38). In other embodiments, the retro-focus lens of FIG. 6 may not have all of the elements or features listed and/or may have other elements or features instead of or in addition to those listed.

FIG. 6 shows the same ray diagram as FIG. 5, but the negative lens (item 32) is displaced relative to the principal axis (item 35) by a certain distance (item 38). The illustrated distance displaced is exaggerated in order to show the principle. In practice, a displacement of around 1 mm would be sufficient to correct the misalignment of the image. Now that the axis of the negative lens (item 32) is no longer on the optical axis, a new virtual image is formed (item 36). The base of the image is also displaced away from the principal axis (item 35). When the positive lens group (item 33) captures the virtual image (item 36), which is displaced from the principal axis, the real image formed (item 37) is also displaced from the optical axis (item 35).

It can be seen from FIG. 5 and FIG. 6 that when the negative lens group (item 32) is displaced in a particular direction (e.g., upwards) away from the optical axis, the real image (item 37) is also displaced from the optical axis in the opposite direction (e.g., downwards). In other words, the real image formed by a retro-focus lens may be moved across the real image plane by moving the negative lens group in the opposite direction, perpendicular to the optical axis.

It is generally accepted to be bad practice to have an optical system where the axes of the optical components are not concentric with the lenses though which the optical axes pass, but a calculation shows that for the innovative configuration in which a negative component is chosen that is weak in power (and has long focal length), the amount of displacement that is needed to achieve the alignment of two three dimensional images is small enough to have a only negligible negative effect on the performance of the system. Prior to discussing FIG. 6 further, FIG. 7 is discussed below, because FIG. 6 is discussed in conjunction with FIG. 7.

Figure 7:
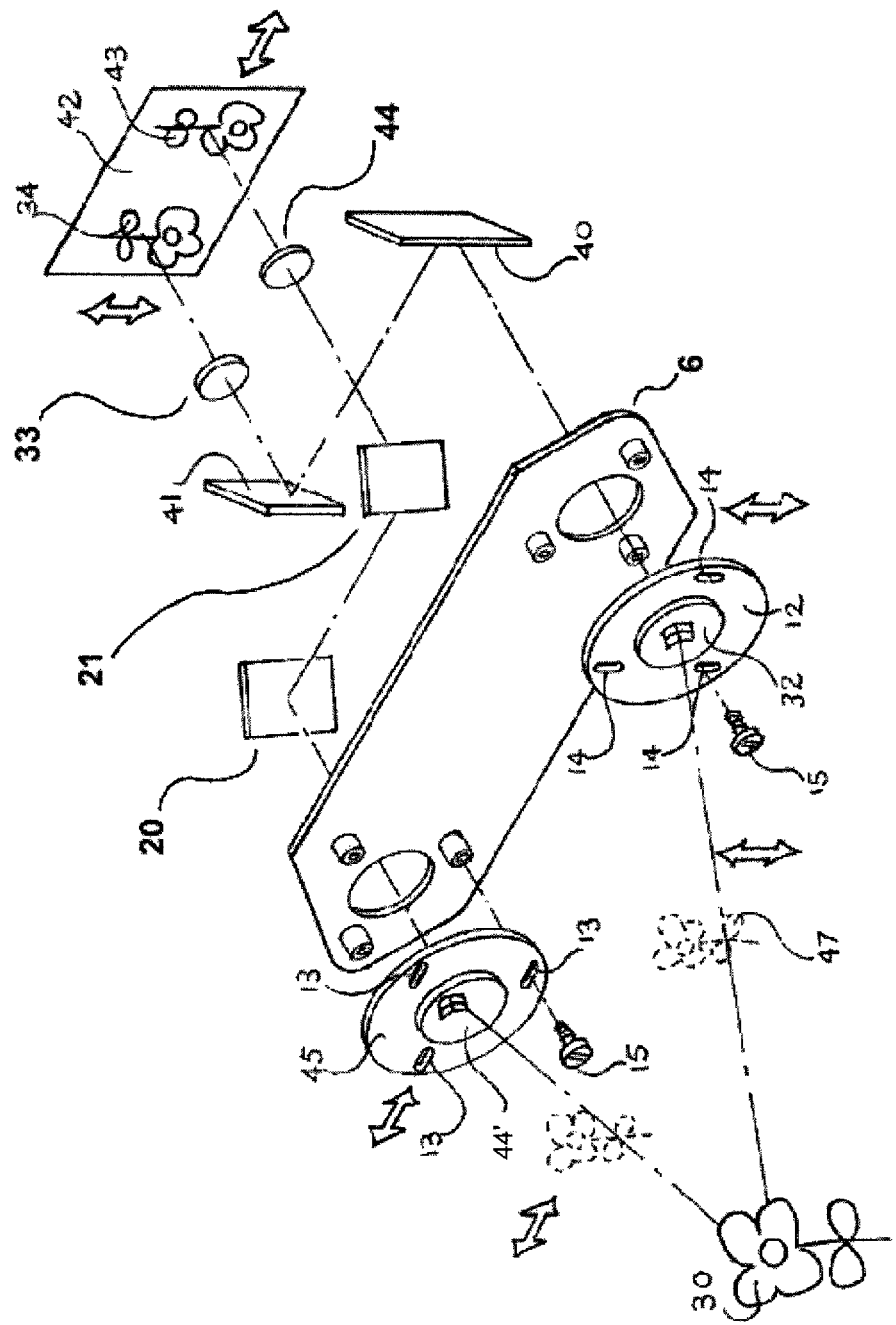
FIG. 7 shows an embodiment of a pair of lens systems that make up a three dimensional image-forming unit.

FIG. 7 shows a pair of lens systems forming a three dimensional image-forming units, having flange (item 12), three horizontal slots (item 13), three vertical slots (item 14), three screws (items 15), object (item 30), negative lens group (item 32), positive lens group (item 33), real image (item 34), mirrors (items 40 & 41), image-capturing device (item 42), real image (item 43), positive lens group (item 44), negative lens group (item 44'), flange (item 45), and virtual image (item 47). In other embodiments, the three dimensional image forming unit of FIG. 7 may not have all of the elements or features listed and/or may have other elements or features instead of or in addition to those listed.

The benefit of using the configuration of FIGS. 6 and 7 having a non-concentric optical axis and a weak negative component is that all the key components may be fitted, adjusted, and locked with negligible stress built in. In other words, once adjusted, the assembled unit will maintain the adjustment. The ray diagram components in FIG. 6 are reproduced in FIG. 7 as one of the pair of lens systems making up the three dimensional image-forming unit. Lens groups (items 32 & 33) are part of a three dimensional image forming device, which also includes mirrors (items 40 & 41). The virtual image (item 47) formed by the negative lens group (item 32) is focused as a real image (item 34) by the positive lens group (item 33) after the virtual image has been reflected by the mirrors (items 40 & 41) onto the image-capturing device (item 42).

Due to manufacturing tolerances, it is likely that a retro focus lens with built-in mirrors (items 32, 20, 21, 33) would not be mounted in exactly the perfect positions as designed. These small errors combined will result in one image (item 34) being formed in a position slightly displaced from the ideal designed position. Similarly, the other image (item 43) may also be slightly displaced from the ideal designed position. The small displacements from the ideal positions of the images results in the image pair (item 34 and item 43) being imprinted on the image-capturing device (item 42) at a slight, but nevertheless significant, displacement to each other. The slight displacement of the image pair imprinted on the image capturing device (item 42) leads to the problems with viewing described previously (in the first two paragraphs). In an embodiment, the effective focal length of the combination of the negative lens group (item 32) and positive lens group (item 33) is 25 mm.

The three horizontal slots (item 13) and three vertical slots (item 14) of FIG. 7 replace the holes in the flanges of FIG. 4. With reference to FIGS. 6 and 7, any small vertical error of the real image in FIG. 7 (item 34) on the image capturing device (item 42) can now be corrected by adjusting the negative lens group (item 32) carried by the flange (item 12) held by three screws (items 15) fitted in the three vertical slots (item 14) in the opposite sense to the direction the image needs to be moved. Similarly the horizontal error of position of the real image (item 43) can be corrected by adjusting the negative lens group (item 44'), by moving the flange (item 45) within the constraints of the mounting screws (items 15) sliding within the three horizontal slots (items 13). Using horizontal slots (items 13) in flange (item 45) while using vertical slots (items 14) in flange (item 12) facilitates adjusting the alignment of images (items 34 and 43), by moving one flange (e.g., flange (item 45)) in only the horizontal direction and moving the other flange (e.g., flange (item 12)) in only the vertical direction. The key to comfortable three dimensional viewing is alignment of the two images in the three dimensional image pair relative to each other. In practice, rather than adjusting each image (item 34 and item 43) to the perfect vertical design position, one image (item 34) can be adjusted to correspond vertically with the other image (item 43). Similarly, rather than adjusting each image (item 34 and item 43), to the ideal horizontal position as designed, one image (item 34) can be adjusted to correspond with the other image (item 43) horizontally. In other words, all the combined vertical components of the small errors in the displacement of the images (items 34 & 43) relative to each other can be compensated for by adjusting the lens group (item 32) vertically relative to the lens panel (item 6). Also, all the combined horizontal components of small errors in displacement of images (items 34 & 43) relative to each other can be compensated for by adjusting the lens group (item 44') horizontally, relative to the lens panel (item 6). Lens panel (item 6) is the long panel that sits between the left and right flanges (item 12) and the mirrors. Lens panel (item 6) has three receptacles on each side, one receptacle for each of the three screws (item 15) to be screwed into lens panel (item 6).

As can be seen, these three dimensional image-forming devices can be built by normal mounting/clamping, bonding methods. No spring-loaded devices are used and the final alignments and adjustments are carried out on two easily accessible negative lenses in the front of the device. If access is not an issue, similar adjustments to the positive lens groups will also yield the same result. Should minor adjustments be needed after it has left the factory, these can be carried out easily by removing the front cover. No further disassembly is necessary.

Alternatives and Extensions

For the purpose of this discussion, lenses (items 17 and 18) and mirrors (items 20 and 21) may be referred to as a first set of optical components, which processes a first stream of light, and lenses (items 22 and 23) and mirrors (items 24 and 25) may be referred to as a second set of optical components, which processes a second stream of light.

In an embodiment, each of the two retro focused lens systems may be replaced with a zoom lens system. In an embodiment the optical component of a given set of optical components (e.g., the first set or second set of optical components) that is adjusted to align the image is one for which a relatively large movement of the optical component results in a relatively small change in location of the image, to facilitate finely adjusting the location of the image by only small amounts, as desired, such that a small change in angle of the optical component result in an even smaller change in angle of the light exiting the last optical component of the set prior to being received on the image capturing device (item 19). For example, the lens that is adjusted is a lens that is relatively weak compared to other lenses in the same set of optical components (which process the same stream of light). In contrast, in this embodiment, an angle of a mirror is not adjusted, because adjusting an angle of a mirror causes the location of the image to move by double the number of degrees compared to the number of degrees through which the mirror is rotated. In an embodiment, the optical component that is adjusted is located at the front of the lens system where the optical component may be easily reached and adjusted. In an embodiment, only one optical component in each light stream is adjustable, and all of the other optical components are held rigidly in place.

In an embodiment, any one of, any combination of, or all of the mirrors of the embodiments of the invention described herein may be replaced with prisms. Also, the mirrors and/or prisms may be used to deflect the light to an image capture device that is in a different location than the location illustrated in FIG. 7. In an embodiment, FIG. 7, the screws (item 15), once loosened to finger tightness, will allow the lens flange (item 12) on one side to slide vertically, and the corresponding lens flange on the other side to slide horizontally, so giving the adjustment. The adjustment is not done by using a screw to move a component. The screws are for locking down the components once the components have been moved to the correct position. The design of FIGS. 6 and 7, having the two sets of slots that are perpendicular to one another, allows the unit to be assembled without high precision engineering, since accurate final corrections can be made after assembly.

Figure 8:
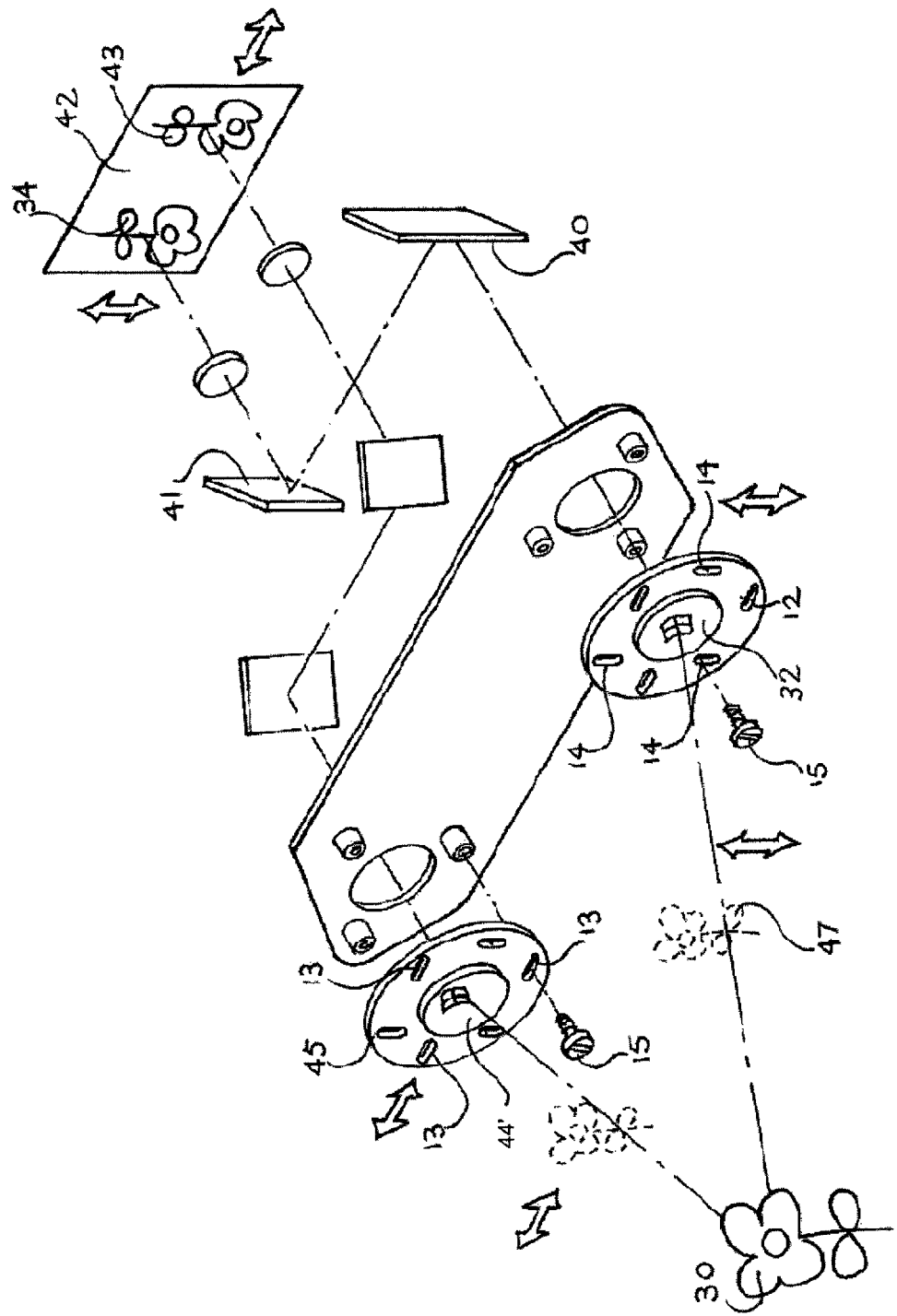
FIG. 8 shows an embodiment of a pair of lens systems that make up another three dimensional image-forming unit.
Figure 9:
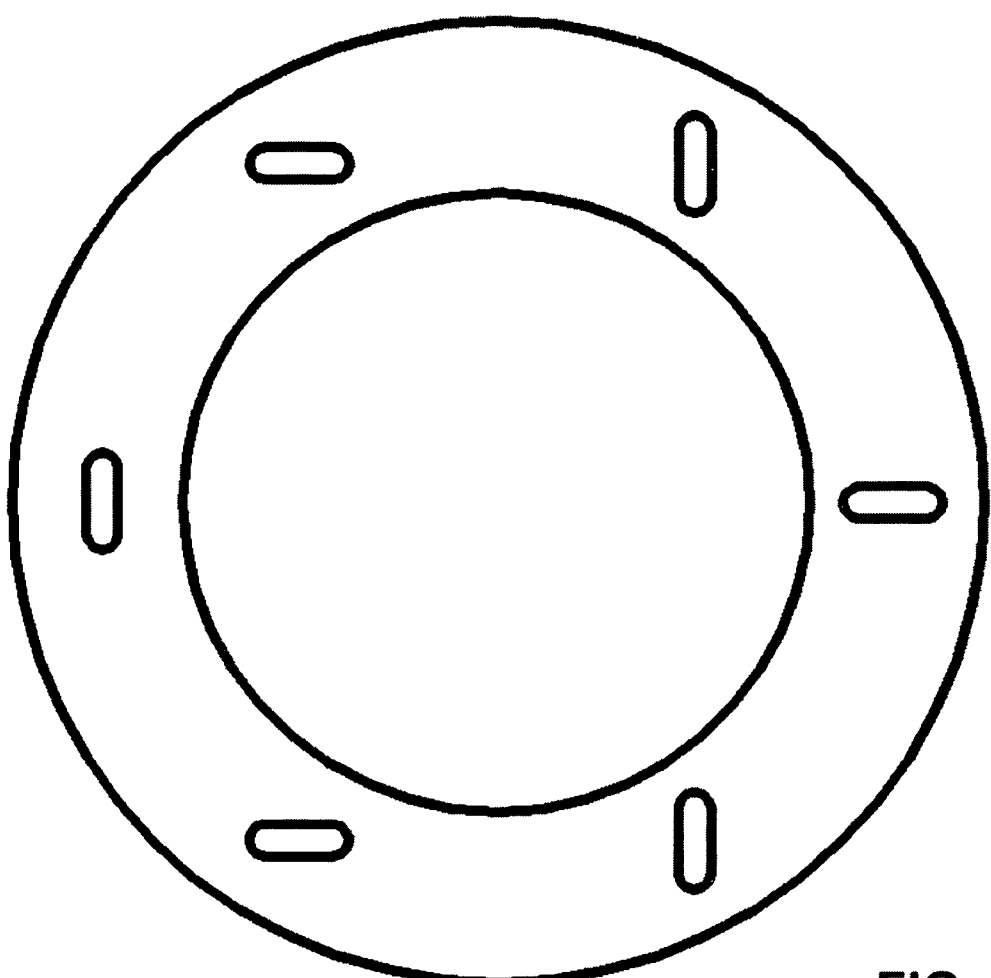
FIG. 9 shows an embodiment of one of the flanges of FIG. 8.

FIG. 8 shows an example of another embodiment having a pair of lens systems that make up another three dimensional image-forming unit. In the embodiment of FIG. 8, each flange has two sets of slots. One set of slots is perpendicular to the other set of slots. Consequently, any flange can be used for either the horizontally adjusting flange or the vertically adjusting flange. Also, any flange can be detached, rotated 90 degrees, and remounted on the same screw points, which would change the flange from one that adjusts the lens position in a horizontal direction to one that adjusts the lens in a vertical direction or would change the flange from one that adjusts the lens position in a vertical direction to one that adjusts the lens in a horizontal direction. FIG. 9 shows an embodiment of one of the flanges of FIG. 8.

In another embodiment, the two sets of slots (whether on the same or on different flanges) are perpendicular to one another, but are not necessarily in the horizontal and vertical directions. In another embodiment, the two sets of slots (whether on the same or on different flanges) are in two different directions, but the directions of the two sets of slots are not necessarily perpendicular to one another. In yet another embodiment, each flange is mounted at only two points and there are only two slots in each set of slots. In yet another embodiment, each flange is mounted at four or more points and there are four or more slots in each set of slots. In yet another embodiment, instead of the slots being on the flanges and the mounting posts being on the plate (item 6), the plate has the slots and the flanges have the mounting posts. In the embodiment, in which the slots are on the plate, at each site where a set of flanges is mounted, there may be one set of slots and the set of slots at one site are at a different directions than the set of slots at the other site (e.g., the two sets may be perpendicular to one another). Alternatively, each site has two sets of slots, where each set has a different direction (e.g., the two sets may be perpendicular to one another). In an embodiment (of any of the above embodiments), each of the slots within each set of slots is parallel to the other slots of the same set.

FURTHER DISCUSSION ABOUT ALTERNATIVES AND EXTENSIONS

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A system comprising:
    a pair of sets of optical components mounted to focus a pair of images, which when viewed simultaneously by a viewer form a three dimensional image;
    the pair of sets of optical components including at least
    a first set of optical components forming a first image of the pair of images;
    a second set of optical components forming a second image of the pair of images, the second set of optical components being a different set than the first set of optical components, each optical component in the second set of optical components has a corresponding optical component in the first set of optical components that have the same optical properties, wherein the first optical components of the first and second sets constitute a pair of corresponding optical components;
    a first adjustable mounting upon which a first of the pair of corresponding optical components is mounted;
    the first adjustable mounting is configured such that adjusting the first adjustable mounting displaces the first image in a first direction;
    a second adjustable mounting upon which a second of the pair of corresponding components is mounted; and
    the second adjustable mounting is configured such that adjusting the second adjustable mounting displaces the second image in a second direction that is perpendicular to the first direction.

2. The system of claim 1, the first set of optical components including at least a first negative lens group that directs light to a first positive lens group, which focuses the light to form a first image of the pair of images, and
    the second set of optical components including at least a second negative lens group that directs light to a second positive lens group, which focuses the light to form a second image of the pair of images.

3. A method of configuring the system of claim 2, comprising:
    displacing the first negative lens group along a vertical direction until the first image is at a level that the second image is at; and
    displacing the second negative lens group along a horizontal direction until the second image is located at a distance from the first image that is comfortable for viewing.

4. The system of claim 1, the first set of optical components is a first zoom lens system, and
    the second set of optical components is a second zoom lens system.

5. The system of claim 1, the first set of optical components having a subset of components that have a first optical axis and at least one optical component that has a second optical axis that is displaced from the first optical axis, and
    the second set of optical components having a subset of optical components having a third optical axis and at least one optical component that has fourth optical axis that is displaced from the third optical axis.

6. The system of claim 1, the first direction is towards or away from the second optical component.

7. The system of claim 1, the first direction is horizontal and the second direction is vertical when the system is in use by a viewer that is viewing the three dimensional image.

8. The system of claim 1, the first of the pair of the corresponding optical components being mounted to the first adjustable mounting at only three points; and
    the second of the pair of the corresponding optical components being mounted to the second adjustable mounting at only three points.

9. A system comprising:
    an image-capture device;
    a first set of optical components including at least a first negative lens group and a first positive lens group;
    a second set of optical components including at least a second negative lens group and a second positive lens group;
    a plate having two holes for light to pass through,
        surrounding a first of the two holes is a first set of three equally spaced mounting posts,
        surrounding a second of the two holes is a second set of three equally spaced mounting posts;
    a first flange having a hole for light to pass through and a first set of three slots corresponding to the first set of equally spaced mounting posts, each of the first set of three slots being parallel to a first direction;
    a second flange having a hole for light to pass through and a second set of three slots corresponding to the second set of equally spaced mounting posts, each of the second set of three slots being parallel to a second direction that is perpendicular to the first direction;
    a first set of three screws mounting the first flange to the first set of three equally spaced mounting posts, when the first set of three screws is loosened the first flange is adjustable in the first direction;
    a second set of three screws mounting the second flange to the second set of three equally spaced mounting posts, when the second set of three screws is loosened the second flange is adjustable in the second direction;
    the first negative lens group including at least one negative lens, the first negative lens group being mounted on the first flange;
    the second negative lens group including at least one negative lens group, the second negative lens groups being mounted on the second flange;
    the first positive lens group including at least one positive lens, the first positive lens group receiving light transmitted through the first negative lens group, the first positive lens group transmits the light from the first positive lens group, and forms a first image on the image-capture device;
    the second positive lens group including at least one positive lens, the second positive lens group receiving light transmitted through the second negative lens group, the first positive lens group transmits the light from the second positive lens group, and forms a second image on the image-capture device;

the first set of optical components having a first principal axis, and the first negative lens group being displaced from the first principal axis, and the second set of optical components having a second principal axis and the second negative lens group being displaced from the second principal axis.

10. A method of configuring the system of claim 9, comprising:

loosening the first set of three screws allows the first flange to be displaced in a vertical direction, displacing the first negative lens group along the vertical direction until the first image is at a level that the second image is at; and loosening the second set of three screws allows the second flange to be to displaced in a horizontal direction, displacing the second negative lens group along a horizontal direction until the second image is located at a distance from the first image that is comfortable for viewing.

11. The system of claim 9, the first set of optical components including a first pair of mirrors, a first mirror of the first pair reflecting the light from the first negative lens group 90 degrees to a second mirror of the first pair, which reflects the light 90 degrees onto the first positive lens group; and the second set of optical components including a second pair of mirrors, a first mirror of the second pair reflecting the light from the second negative lens group 90 degrees to a second mirror of the second pair, which reflects the light 90 degrees onto the second positive lens group.

12. The system of claim 9, the first set of optical components including one or more optical components for bending light traveling through the first set of optical components, so that a distance travelled by the light traveling through the first set of optical components is longer than a distance from the image capture device to an entry point for light into the first set of optical components; and the second set of optical components including one or more optical components for bending light traveling through the second set of optical components, so that a distance travelled by the light traveling through the second set of optical components is longer than a distance from the image capture device to an entry point for light into the second set of optical components.

13. A system comprising:

a three dimensional imaging device that receives incident light from an object through a first set of lenses to form a first image of the object, and incident light from the same object through a second set of lenses to form a second image of the object, such that the first image of the object and the second image of the object are not misaligned with one another;

the first set of lenses being mounted on a first adjustable mounting, and as a result of being mounted on the first adjustable mounting, the first set of lenses being adjustable by sliding the first set of lenses along a straight line in a first direction;

the second set of lenses being mounted on a second adjustable mounting, and as a result of being mounted on the second adjustable mounting, the second set of lenses being adjustable by sliding the second set of lenses along a straight line in a second direction that is perpendicular to the first direction;

a pair of sets of optical components mounted to focus the first image of the object and the second image of the object, which when viewed simultaneously by a viewer form a three dimensional image; and the pair of sets of optical components including at least a first set of optical components forming the first image of the object, the first set of optical components including at least the first set of lenses;

a second set of optical components forming the second image of the object, the second set of optical components including at least the second set of lenses, each optical component in the second set of optical components corresponds to an optical component in the first set of optical components in that the optical components in the second set of optical components and the optical components in the first set of optical components have the same optical properties.

* * * * *